US011981388B2

(12) United States Patent
Gemperle (10) Patent No.: US 11,981,388 B2
(45) Date of Patent: May 14, 2024

(54) SELF-BALANCING VEHICLE

(71) Applicant: SCEWO AG, Winterthur (CH)

(72) Inventor: Thomas Gemperle, Winterthur (CH)

(73) Assignee: SCEWO AG, Winterthur (CH)

( * ) Notice: Subject to any disclaimer, the term of this patent is extended or adjusted under 35 U.S.C. 154(b) by 637 days.

(21) Appl. No.: 17/261,360

(22) PCT Filed: Jul. 23, 2019

(86) PCT No.: PCT/EP2019/069788
§ 371 (c)(1),
(2) Date: Jan. 19, 2021

(87) PCT Pub. No.: WO2020/020880
PCT Pub. Date: Jan. 30, 2020

(65) Prior Publication Data
US 2021/0284273 A1    Sep. 16, 2021

(30) Foreign Application Priority Data
Jul. 27, 2018   (EP) ..................................... 18186049

(51) Int. Cl.
*B62K 11/00*    (2006.01)
*A61G 5/04*    (2013.01)
(Continued)

(52) U.S. Cl.
CPC ............ *B62K 11/007* (2016.11); *A61G 5/041* (2013.01); *A61G 5/066* (2013.01); *A61G 5/107* (2013.01); *A61G 5/1086* (2016.11); *A61G 5/128* (2016.11)

(58) Field of Classification Search
CPC ...... B62K 11/007; A61G 5/041; A61G 5/066; A61G 5/107; A61G 5/1086; A61G 5/128
See application file for complete search history.

(56) References Cited

U.S. PATENT DOCUMENTS 4,898,256 A * 2/1990 Lehner ................. A61G 5/1054
180/907
5,423,563 A * 6/1995 Wild ....................... B62B 5/026
280/5.22
(Continued)

FOREIGN PATENT DOCUMENTS

DE    102007061708 A1    6/2009
WO      1994007452 A1    4/1994
WO      2010109466 A1    9/2010

OTHER PUBLICATIONS

Ong, Hong Djien, "Written Opinion of the International Searching Authority for International Application No. PCT/EP2019/069788," European Patent Office, dated Aug. 19, 2019.
(Continued)

*Primary Examiner* — Kevin Hurley
*Assistant Examiner* — Michael R Stabley
(74) *Attorney, Agent, or Firm* — Florek & Endres PLLC (57) ABSTRACT

A self-balancing vehicle comprising two axially spaced wheels (3, 4) mounted on a main body (2), an electric drive coupled to at least one wheel (3, 4), control means adapted to maintain the vehicle in balance by controlling the drive, a receptable for carrying and conveying a load, the vehicle having an adjustment mechanism (7) for linear displacement of the receptable arranged so that the receptable is adjustable by the linear displacement both along the longitudinal axis and along the vertical axis of the vehicle.

10 Claims, 8 Drawing Sheets

(51) Int. Cl.
*A61G 5/06* (2006.01)
*A61G 5/10* (2006.01)
*A61G 5/12* (2006.01)

(56) References Cited

U.S. PATENT DOCUMENTS

| | | | | |
|---|---|---|---|---|
| 6,405,816 | B1 * | 6/2002 | Kamen | A61G 5/125 |
| | | | | 180/41 |
| 7,004,271 | B1 * | 2/2006 | Kamen | B62K 1/00 |
| | | | | 180/21 |
| 7,007,965 | B2 * | 3/2006 | Bernatsky | A61G 5/12 |
| | | | | 280/250.1 |
| 7,017,686 | B2 * | 3/2006 | Kamen | G05D 1/0891 |
| | | | | 180/7.1 |
| 7,316,405 | B2 * | 1/2008 | Kritman | A61G 5/061 |
| | | | | 180/326 |
| 7,690,447 | B2 * | 4/2010 | Kamen | B62D 61/00 |
| | | | | 180/21 |
| 7,866,429 | B2 * | 1/2011 | Ishii | B62K 11/007 |
| | | | | 180/218 |
| 8,271,185 | B2 * | 9/2012 | Doi | B62K 11/007 |
| | | | | 180/165 |
| 8,346,441 | B2 * | 1/2013 | Miki | B62D 61/00 |
| | | | | 180/326 |
| 8,371,403 | B2 * | 2/2013 | Underwood | B62D 55/075 |
| | | | | 180/9.1 |
| 8,490,723 | B2 * | 7/2013 | Heinzmann | B62K 11/007 |
| | | | | 180/218 |
| 8,565,982 | B2 * | 10/2013 | Lofstrand | F16M 11/20 |
| | | | | 280/35 |
| 8,688,303 | B2 * | 4/2014 | Stevens | B60L 7/26 |
| | | | | 701/1 |
| 9,126,497 | B2 * | 9/2015 | Heinzmann | G01R 31/3648 |
| 9,445,959 | B2 * | 9/2016 | Kim | A61G 5/041 |
| 9,452,691 | B2 * | 9/2016 | Löfstrand | B60N 2/02246 |
| 9,682,603 | B2 * | 6/2017 | Richter | A61G 5/1056 |

OTHER PUBLICATIONS

Ong, Hong Djien, "Written Opinion of the International Preliminary Examining Authority for International Application No. PCT/EP2019/069788," European Patent Office, dated May 13, 2020.

* cited by examiner

SELF-BALANCING VEHICLE

The invention relates to a self-balancing vehicle comprising two wheels axially spaced from each other and mounted on a main body, an electric drive coupled to at least one wheel, a control device adapted to maintain the vehicle in balance by controlling the drive, and a receptacle for supporting and carrying a load.

Self-balancing vehicles are known that have either a fixed, non-height-adjustable seat or a seat that can be adjusted in the vertical direction. Adjusting the seat height is advantageous when the user transfers from another seat to the vehicle or exits the vehicle. Lowering the seat allows the user to drive the vehicle close enough to a table so that the user's legs are below a tabletop. In other situations, an elevated seating position is advantageous, for example when the user wants to communicate at eye level with other standing persons.

The object of the invention is to provide a self-balancing vehicle that enables con-venient seat adjustment.

To solve this problem, a self-balancing vehicle of the type mentioned above is provided according to the invention with an adjustment mechanism for linear displacement of the support, which is arranged in such a way that the support can be adjusted by the linear displacement both along the longitudinal axis and along the vertical axis of the vehicle.

The invention has the advantage that the seat can be adjusted horizontally and vertically at the same time due to the axis being inclined to the horizontal axis. Thus, the adjustment mechanism requires only a single drive.

In the vehicle according to the invention, it is preferred that the adjustment mechanism has a linear drive. The linear drive can be designed as a spindle drive, for example. Such a linear drive is particularly space-saving.

With particular advantage, it can be provided in the vehicle according to the invention that the adjustment mechanism is continuously adjustable. The stepless adjustment enables a particularly simple transfer of a user to and from the vehicle.

It is also within the scope of the invention that the adjustment mechanism comprises a telescopic extension attached to the main body on the one hand and to the seat on the other. When the linear actuator of the adjustment mechanism is activated, the movable part of the telescopic extension is displaced, causing the seat to be raised or lowered and moved forward or backward in the desired manner.

Preferably, the telescopic extension of the wheelchair according to the invention has a left and a right extendable telescopic rail, which are connected to each other by a connecting plate. When the linear drive of the adjustment mechanism is activated, the two telescopic rails are extended and retracted simultaneously and in parallel. Accordingly, the seat connected to the moving part of the telescopic extension is moved in the desired direction and raised or lowered.

One embodiment of the vehicle according to the invention provides that it is suita-ble for negotiating on a staircase or a ramp and is drivable in a first mode of operation, intended substantially for a level surface, by the wheels mounted on the main body and in a second mode of operation, intended for negotiating on a staircase or a ramp, by means of a crawler-type undercarriage or a tracked undercarriage comprising a wrapping means or a belt. In the first mode of operation, the vehicle is driven by the two wheels spaced apart from each other, which are coupled to an electric drive. The crawler-type or tracked undercarriage can be moved to an elevated position for this purpose. In the second operating mode, which is intended for negotiating a staircase or ramp, the crawler-type or tracked undercarriage is driven by an electric drive. The two wheels are in an elevated position.

In the vehicle according to the invention, it is particularly preferred that the receptacle is designed as a seat on which a footrest is arranged which can be adjusted together with the seat. The footrest is firmly connected to the seat and can thus be adjusted together with the seat.

Particularly preferred is an embodiment of the vehicle according to the invention in which the seat can be adjusted so far forward that the footrest is located in front of one or the crawler-type or tracked undercarriage.

The vehicle according to the invention can in particular be designed as a wheelchair.

Further advantages and details of the invention are explained below with reference to the drawings by way of an example of an embodiment. The drawings are schematic representations and show.

Figure 1:
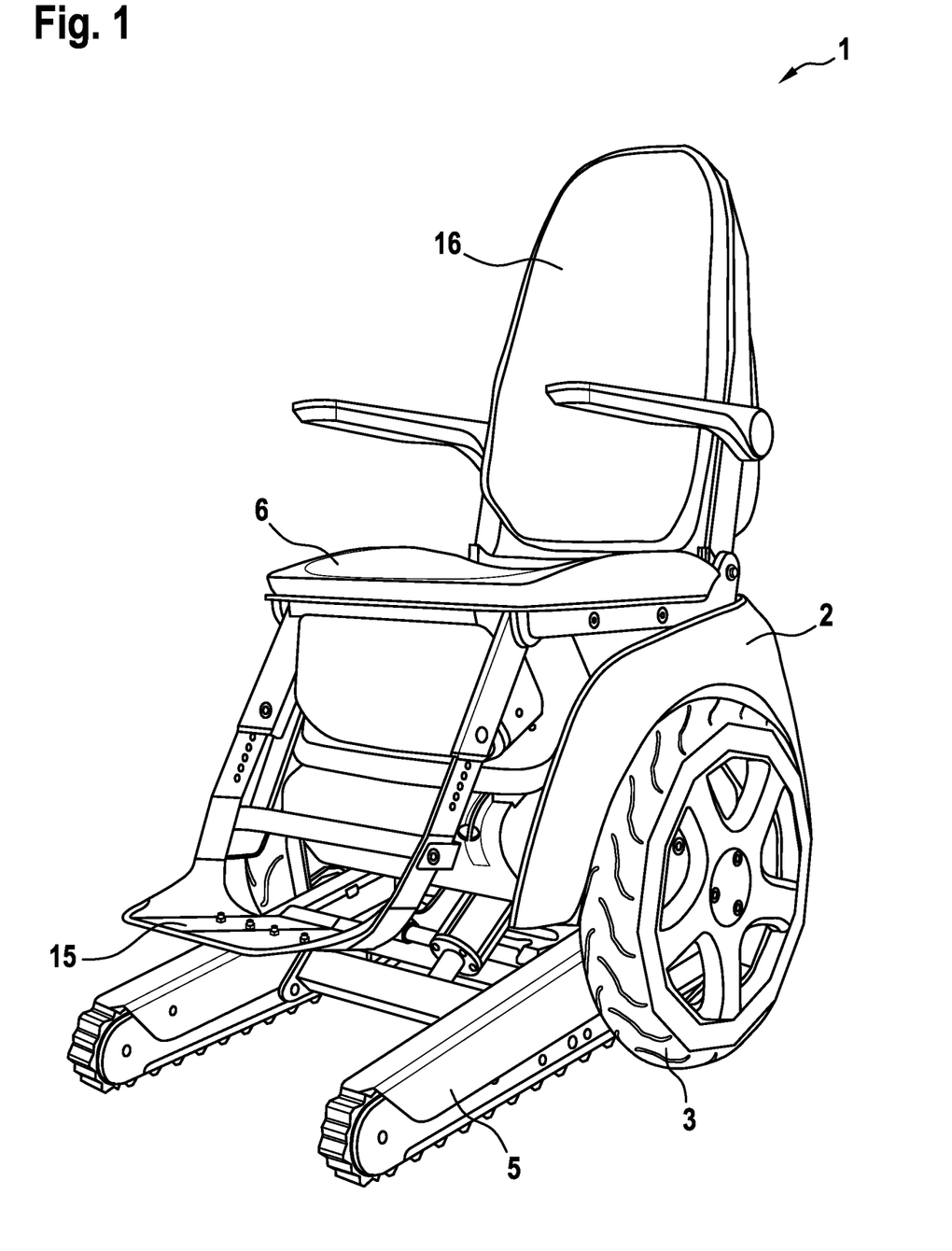
FIG. 1 an embodiment of a vehicle according to the invention designed as a wheelchair in a perspective view, FIG. 2 the wheelchair of FIG. 1 in a side view, FIG. 3 the wheelchair of FIG. 1 after adjusting the seat to a lower and forward displaced position, FIG. 4 the wheelchair of FIG. 3 in a side view, FIG. 5 the main body of the wheelchair with wheels and a crawler chassis, FIG. 6 the adjustment mechanism of the vehicle according to the invention in the form of a wheelchair, FIG. 7 a schematic representation of the adjustment process in a side view, FIG. 8 a section along line VIII-VIII of FIG. 7, and FIG. 9 a similar illustration to FIG. 7 with the seat lowered.
Figure 2:
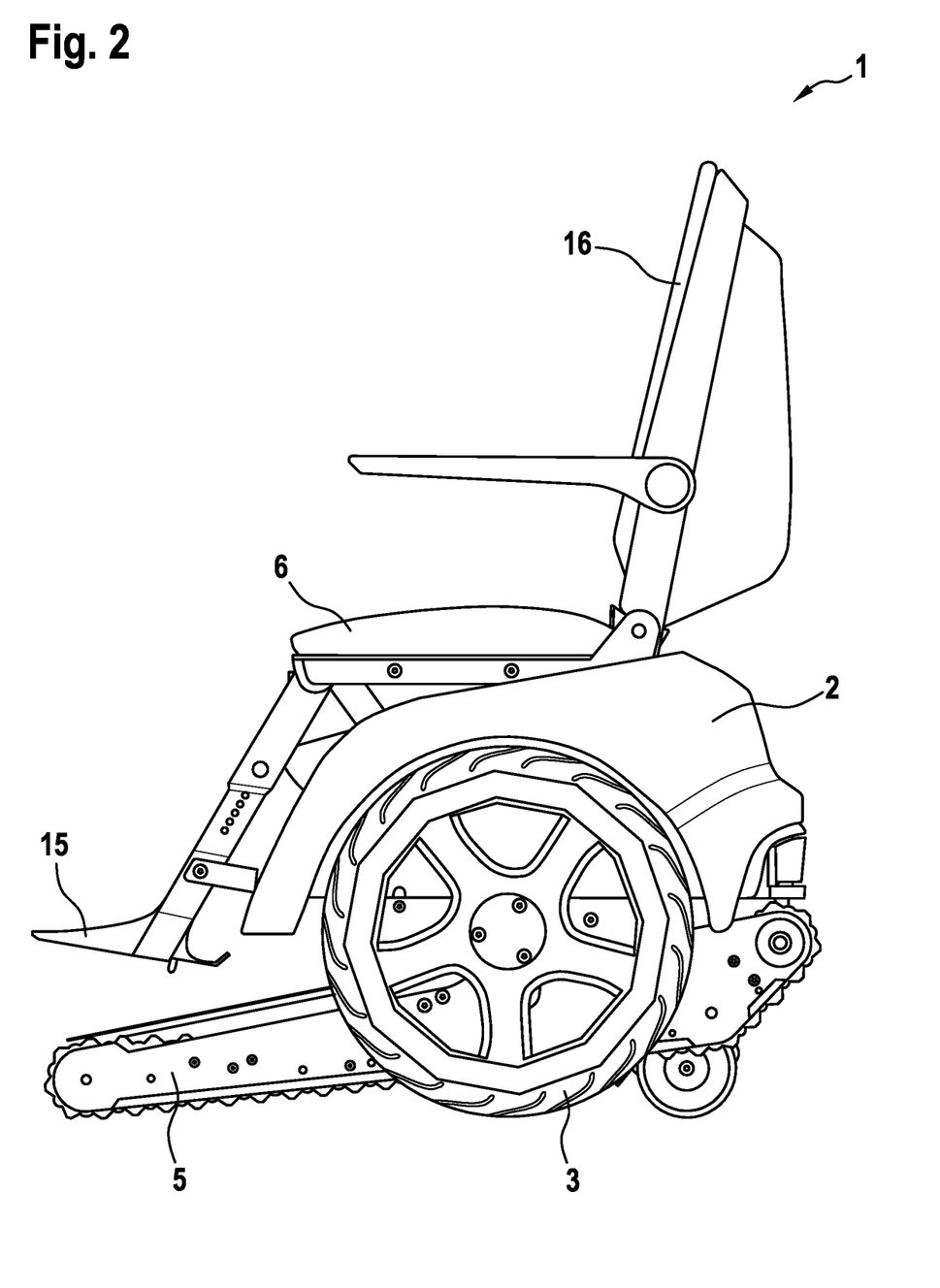
Figure 3:
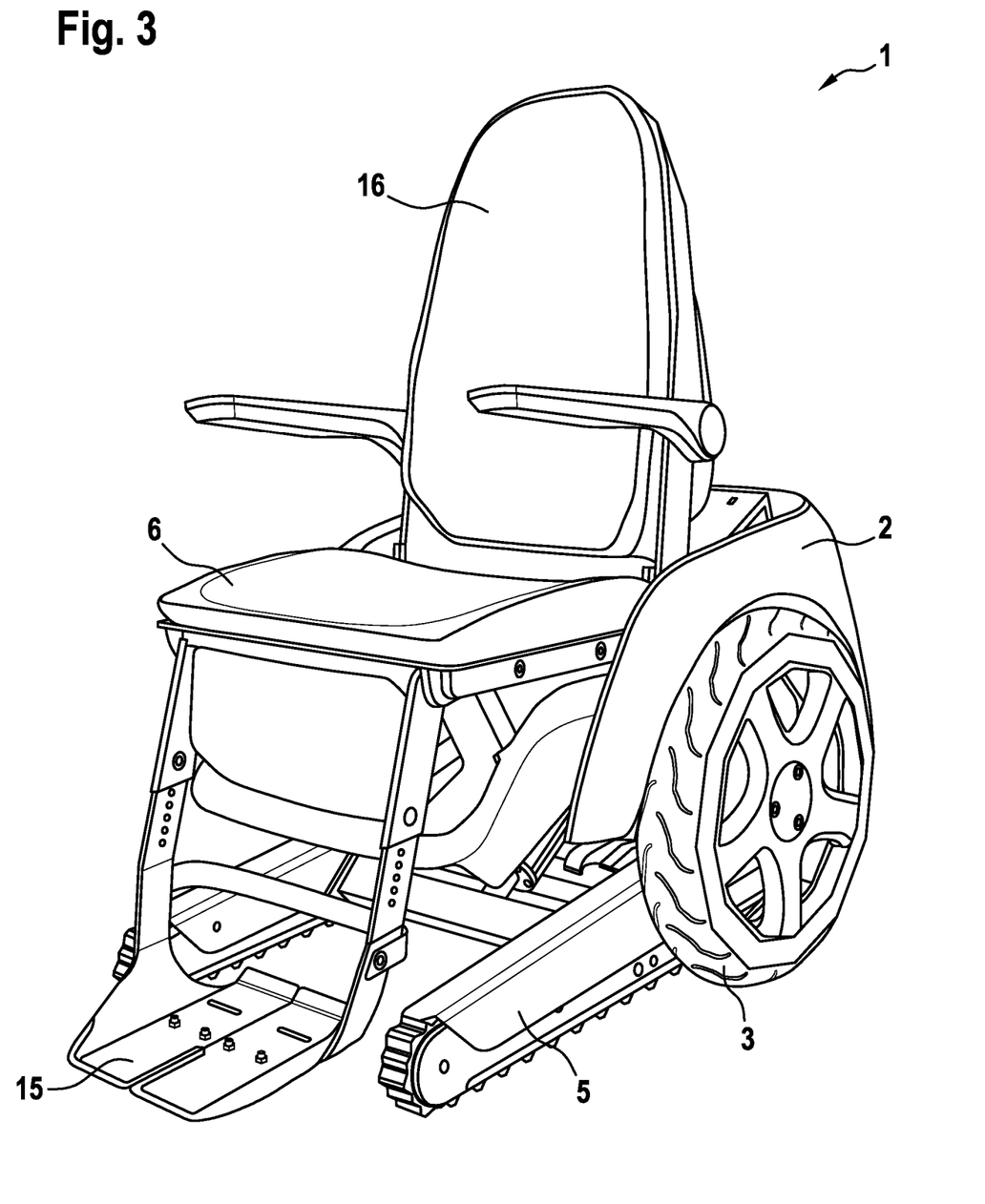
Figure 4:
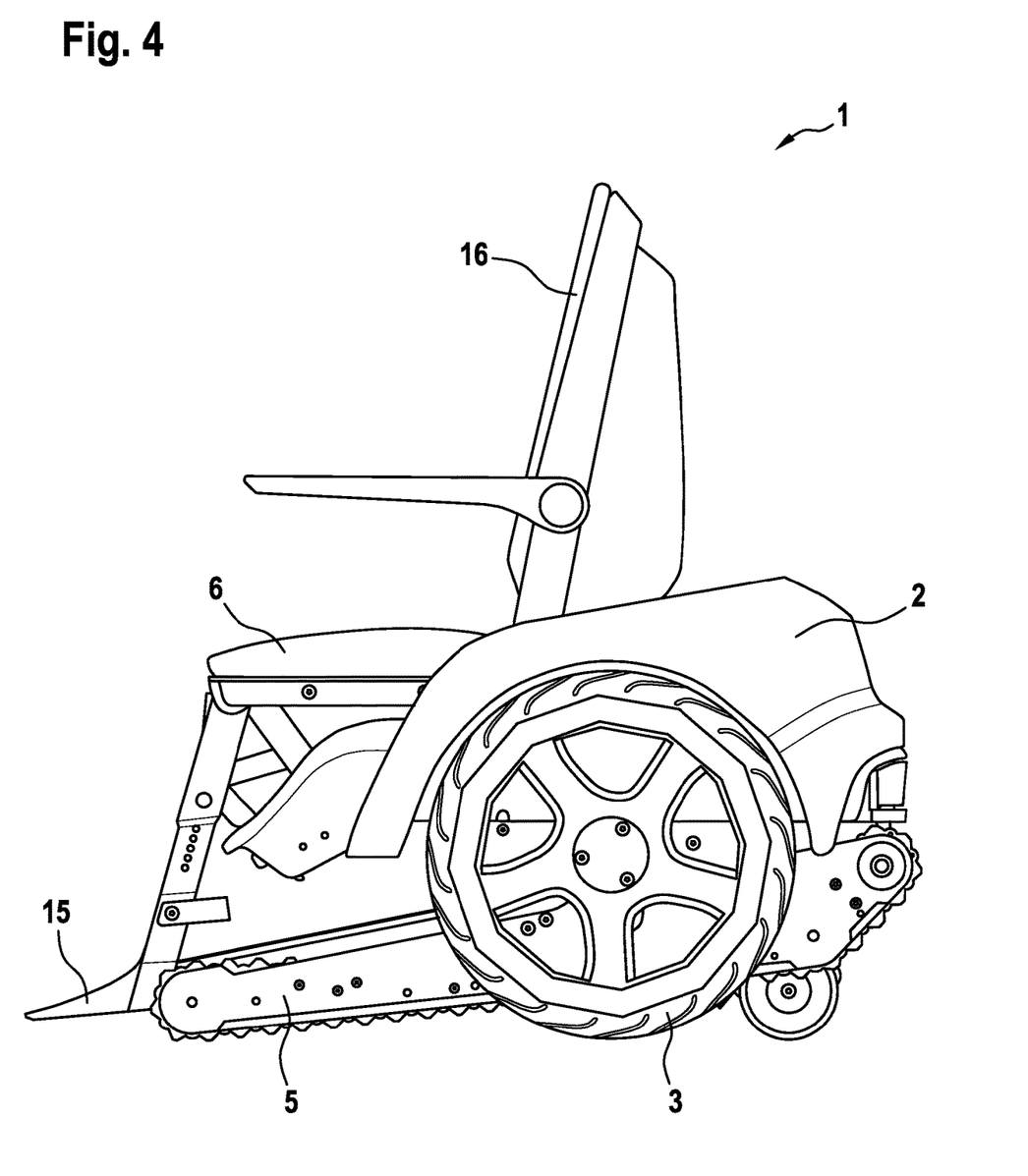

The wheelchair 1 shown in FIGS. 1 to 4 comprises a main body 2 which is provided with wheels 3, 4 on both sides. The wheelchair 1 has an electric drive, not shown in more detail, by which the wheels 3, 4 can be driven. The wheels 3, 4 are used for driving on a substantially level surface. FIG. 1 is a perspective view, FIG. 2 is a side view.

In addition, the wheelchair 1 has a crawler chassis 5 which comprises a wrapping means in form of a chain or a belt. By means of the crawler chassis 5, the wheelchair 1 is able to negotiate a staircase or a ramp. In this second mode of operation, the wheels 3, 4 are in a raised position. In the first mode of operation, on the other hand, when the wheelchair 1 is moved by means of the wheels 3, 4, the crawler undercarriage 5 is in a raised position. By means of a control device (not shown), the drive can be controlled in such a way that the wheelchair carrying the user is supported and thus balanced only by the wheels 3, 4. Accordingly, the wheelchair 1 is designed as a self-balancing vehicle.

The wheelchair 1 comprises a receptacle designed as a seat 6. The seat 6 is shown in FIG. 1 and FIG. 2 in a raised position and in FIG. 3 and FIG. 4 in a lowered position. The wheelchair 1 has an adjustment mechanism configured to adjust the seat 6 by linear displacement along an axis inclined to the horizontal axis.

Figure 5:
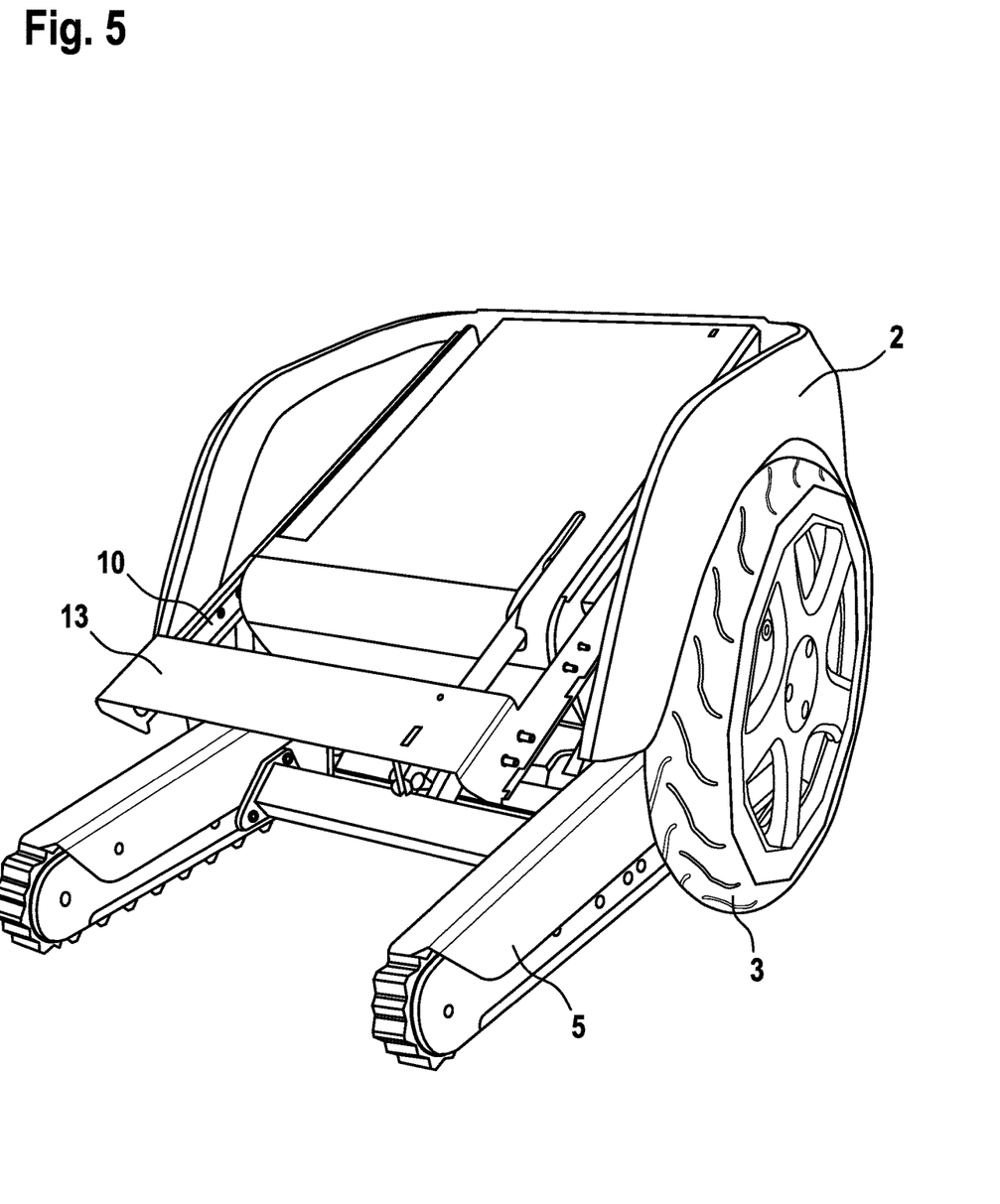

FIG. 5 shows the basic body 2 of the wheelchair 1 with the wheels 3, 4 and the crawler chassis 5.

Figure 6:
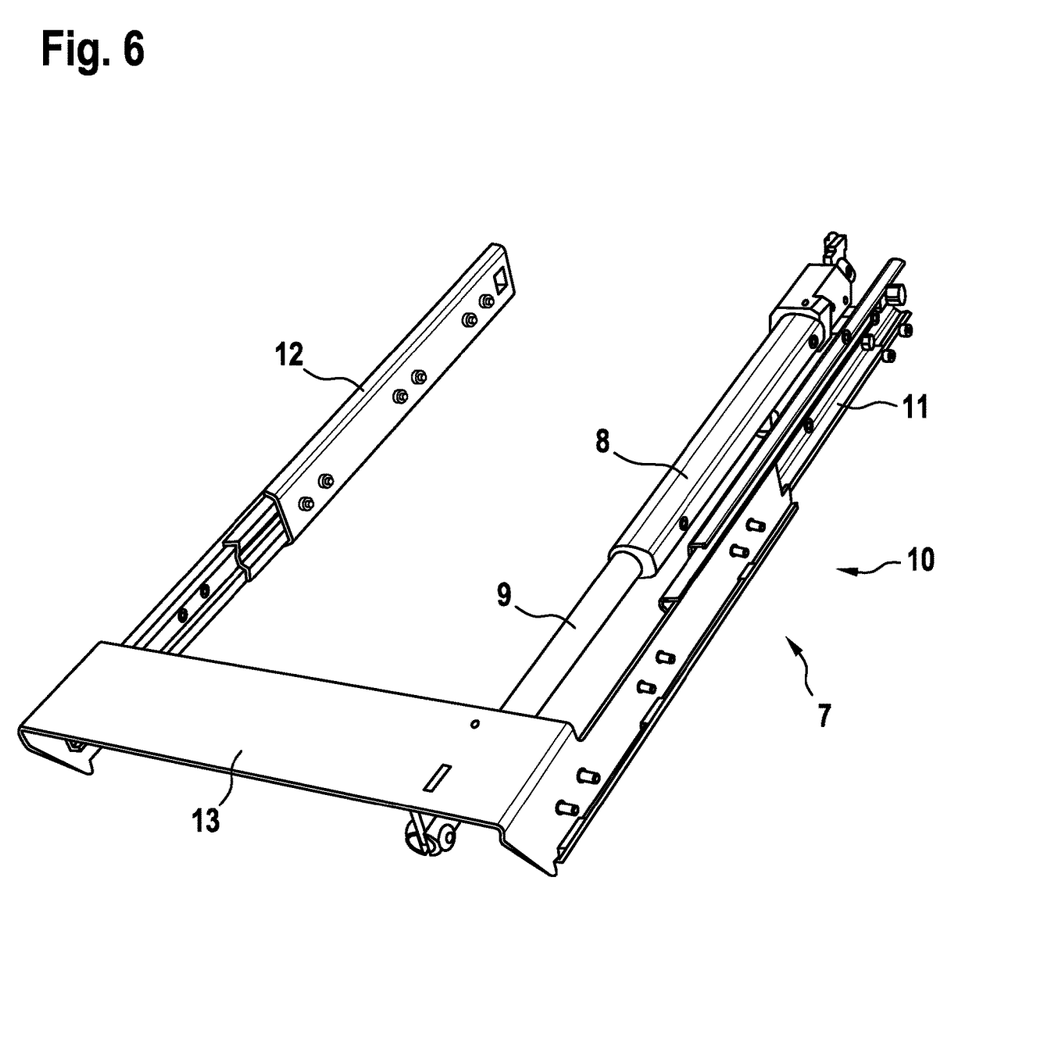

FIG. 6 shows the main components of the adjustment mechanism 7. The adjustment mechanism 7 shown in FIG. 6 comprises a linear drive 8, which in the embodiment shown is designed as a spindle drive. When the linear drive 8 is activated, a spindle 9 can be retracted or extended linearly. The adjustment mechanism 7 comprises a telescopic extension 10 with a left telescopic rail 11 and a right telescopic rail 12. A fixed part of the two telescopic rails 11, 12 is firmly connected to the main body 2. An extendable part of the two telescopic rails 11, 12 is connected to the seat 6 not shown in FIGS. 5 and 6. The two telescopic rails 11, 12 are connected to each other by a connecting plate 13 extending in the transverse direction. By means of the adjustment mechanism shown in FIGS. 5 and 6, the seat 6 can thus be moved linearly relative to the basic body 2 of the wheelchair in order to adjust the seat height.

Figure 7:
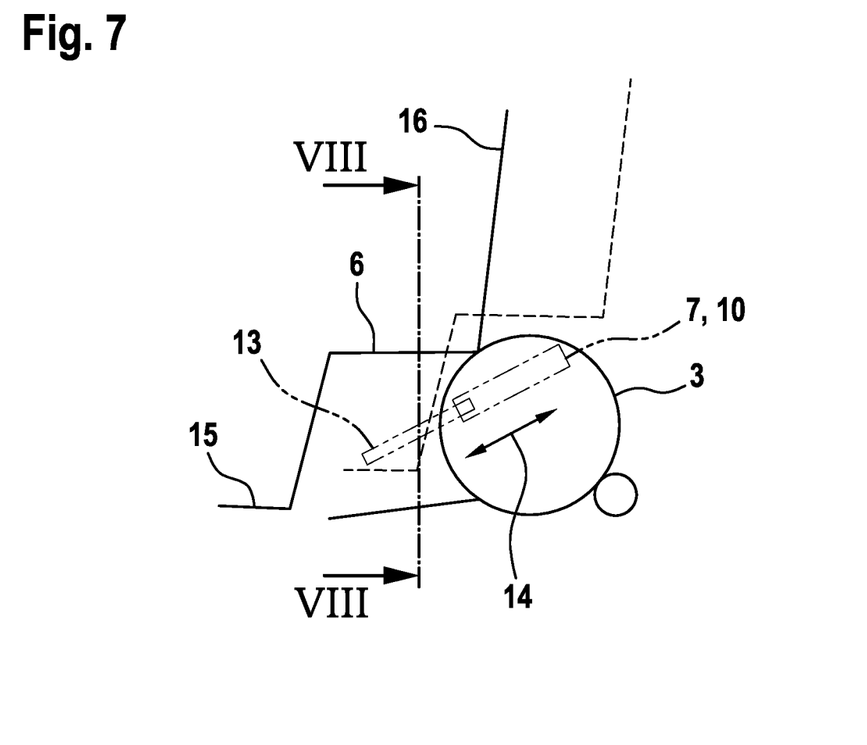

FIG. 7 is a side view and schematically shows the arrangement of the adjustment mechanism 7 in the wheelchair 1. The front end of the adjustment mechanism 7 is inclined downward with respect to the horizontal axis so that the connecting plate 13 is in a lower position compared to the fixed parts of the telescopic rails 11, 12. By activating the adjustment mechanism 7, i.e. by switching on the linear actuator 8, the seat 6 is displaced along the direction indicated by the double arrow 14. Due to the inclined or tilted arrangement of the linear drive 8, a vertical movement of the seat 6 is coupled with a horizontal displacement. The linear drive 8 thus moves the seat 6 "diagonally" in two axes. A lowering movement of the seat 6 causes it to be displaced forward at the same time. When the seat 6 is raised, it is simultaneously moved backwards.

FIG. 7 shows schematically that when the seat 6 is adjusted, the footrest 15 firmly connected to it and the backrest 16 firmly connected to the seat 6 are also moved. The solid line shows a position in which the seat 6 is in a lowered position, the dashed line shows a raised position of the seat 6.

Figure 8:
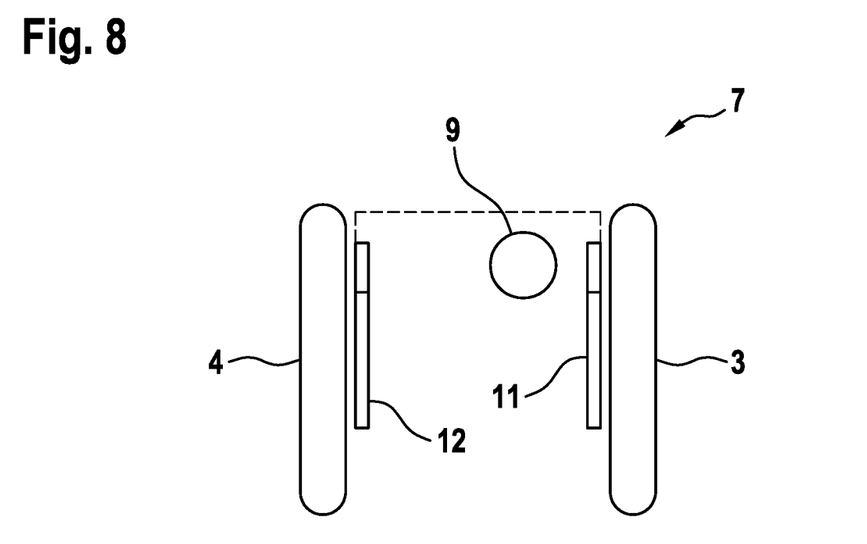

FIG. 8 is a sectional view and shows the main components of the adjustment mechanism 7 cut along line VIII-VIII of FIG. 7. It can be seen that the telescopic rails 11, 12 of the adjustment mechanism 7 are arranged on the inside of the wheels 3, 4 in parallel in the longitudinal direction. The adjustment mechanism 7 can thus be accommodated in the wheelchair 1 in a space-saving manner.

Figure 9:
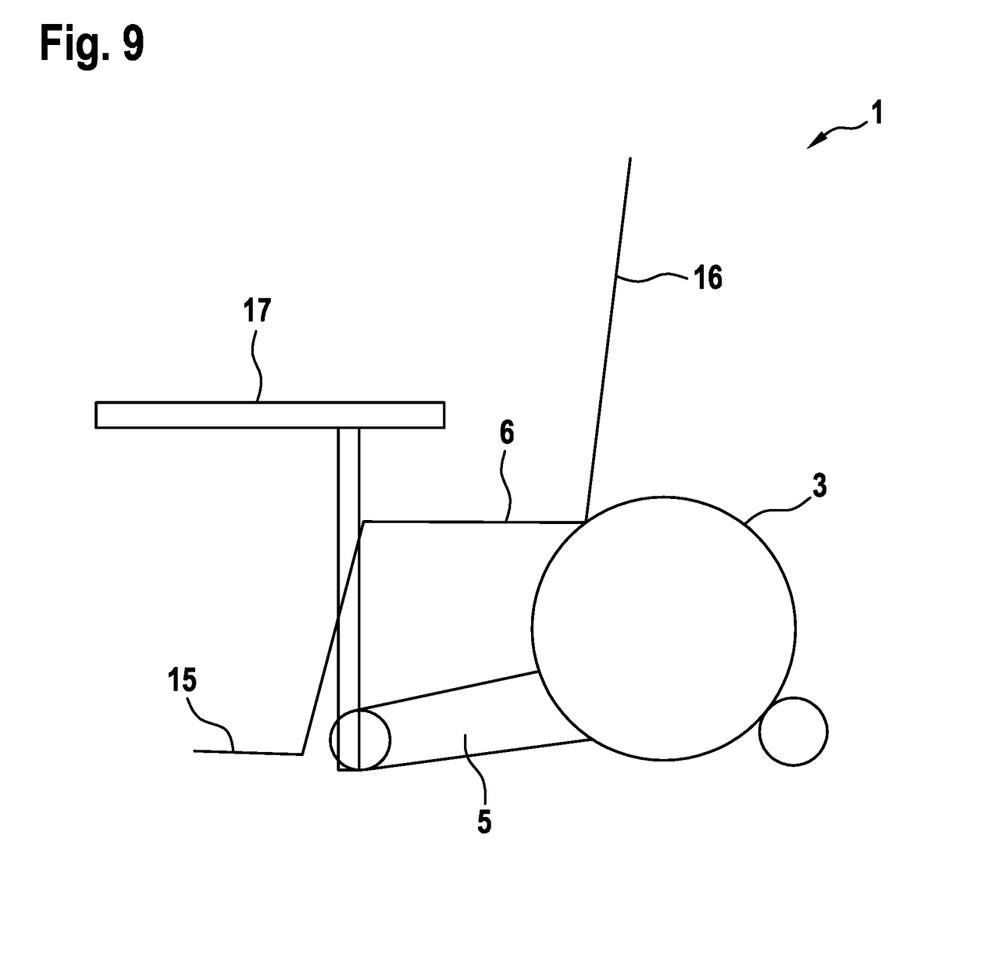

FIG. 9 shows the wheelchair 1 after the seat 6 has been moved to a lower position. The footrest 15 is located just above the floor. In this lowered position of the wheelchair 1, the user can move under a table 17 until his legs are below the tabletop. Since the footrest 15 is located in front of the wheelchair 1, it is not neces-sary to move the wheelchair 1 further in the direction of the table 17.

The wheelchair 1 has a control element that can be designed as a switch or as a combination of several switches, as a button or as a combination of several buttons, as a joystick or as a touch-sensitive surface or as a combination of the mentioned input devices. By means of the control element, the user can operate the adjustment mechanism 7.

The invention claimed is:

1. A self-balancing vehicle, comprising:
two axially spaced wheels mounted on a main body,
an electric drive coupled to at least one wheel,
a control device designed to keep the vehicle in balance by controlling the drive, the vehicle being supported and thus balanced solely by the two wheels spaced apart from one another,
a receptacle for carrying and transporting a load,
wherein the vehicle has an adjustment mechanism for linear displacement of the receptacle, which is fixedly connected to the main body and arranged such that the receptacle is adjustable by the linear displacement both along the longitudinal axis and along the vertical axis of the vehicle by inclining the front end of the adjusting mechanism downwardly with respect to the horizontal axis extending in the transverse direction of the self-balancing vehicle, said adjustment mechanism comprising a telescopic extension which is attached to the main body on one end and to the receptacle on the other end.

2. The self-balancing vehicle according to claim 1, wherein the adjustment mechanism comprises a linear drive.

3. The self-balancing vehicle according to claim 1, wherein the receptacle is continuously adjustable by means of the adjustment mechanism.

4. The self-balancing vehicle according to claim 1, wherein the telescopic extension comprises a left and a right extendable telescopic rail which are connected to each other by a connecting plate.

5. The self-balancing vehicle according to claim 1, drivable in a first mode of operation, intended substantially for a flat surface, by means of wheels mounted on the main body and in a second mode of operation, adapted for negotiating a staircase or a ramp, by means of a crawler or tracked undercarriage comprising a wrapping means.

6. The self-balancing vehicle according to claim 5, wherein the receptacle is designed as a seat on which an adjustable footrest is arranged.

7. The self-balancing vehicle according to claim 6, wherein the seat is adjustable forward to such an extent that the footrest is located in front of the crawler or tracked undercarriage.

8. The self-balancing vehicle according to claim 1, wherein the receptacle is designed as a seat on which an adjustable footrest is arranged.

9. The self-balancing vehicle according to claim 8 further comprising a crawler or tracked undercarriage, wherein the seat is adjustable forward to such an extent that the footrest is located in front of the crawler or tracked undercarriage.

10. The self-balancing vehicle according to claim 1, which is designed as a wheelchair.

* * * * *